United States Patent [19]

Harris et al.

[11] Patent Number: 4,852,821
[45] Date of Patent: Aug. 1, 1989

[54] SPOOL FOR WEB-SHAPED FILM

[75] Inventors: Clark E. Harris, Fairport; Randy Armbruster; Michael Decker, both of Rochester; Bradley A. Phillips, Honeoyo Falls, all of N.Y.

[73] Assignee: Eastman Kodak Company, Rochester, N.Y.

[21] Appl. No.: 237,027

[22] Filed: Aug. 29, 1988

[51] Int. Cl.$^4$ .................. B65H 75/18; G03B 17/26
[52] U.S. Cl. ..................................... 242/71.8; 242/74
[58] Field of Search .................. 242/71.8, 71.9, 71, 242/74, 68.5

[56] References Cited

U.S. PATENT DOCUMENTS

| | | |
|---|---|---|
| 1,930,144 | 10/1933 | Lee . |
| 2,017,160 | 10/1935 | Parker . |
| 2,182,398 | 12/1939 | Gantnier ............................ 242/74 |
| 3,361,380 | 1/1968 | Mizutani ............................ 242/74 |
| 4,008,863 | 2/1977 | Föhl . |
| 4,119,281 | 10/1978 | Paitula et al. . |
| 4,220,292 | 9/1980 | Mizutani et al. ................... 242/71.8 |
| 4,305,554 | 12/1981 | Anderson . |
| 4,506,843 | 3/1985 | Lührig et al. ....................... 242/74 |

Primary Examiner—Stuart S. Levy
Assistant Examiner—Steven M. duBois
Attorney, Agent, or Firm—G. Herman Childress

[57] ABSTRACT

A spool for holding photographic film, consisting of a core member provided with flanges between which flexible film may be wound and an elongated slot into which the end portion of a film strip may be entered and fastened. Adjacent the flanges are raised shoulders extending about the circumference of the core and above the core surface. The shoulders each gradually increase in thickness in the film-winding direction and terminate in a stepped portion corresponding to the thickness of the film. In a preferred embodiment, shoulder portions accommodate the edge portion of a full-width film, have an initial height above the surface level of said spool, and then rise gradually to an additional height approximately equal to the thickness of the film. When the full-width portion of the film is juxtaposed the spool flanges, said shoulders provide the film with a substantially level transition surface for each convolution of the full-width film, thereby avoiding imperfections on the spool-core surface.

9 Claims, 3 Drawing Sheets

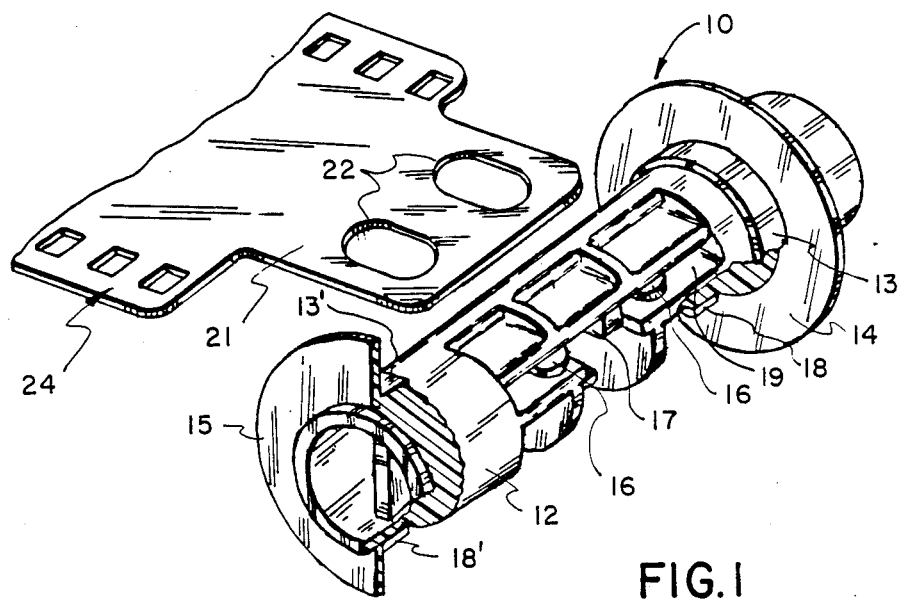
FIG. 1
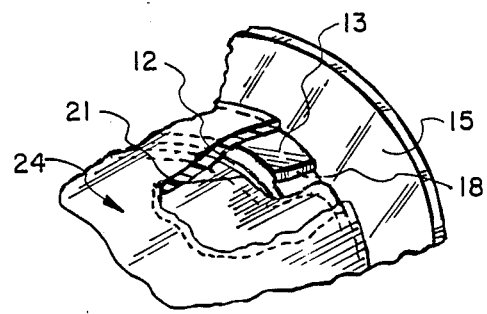
FIG. 8
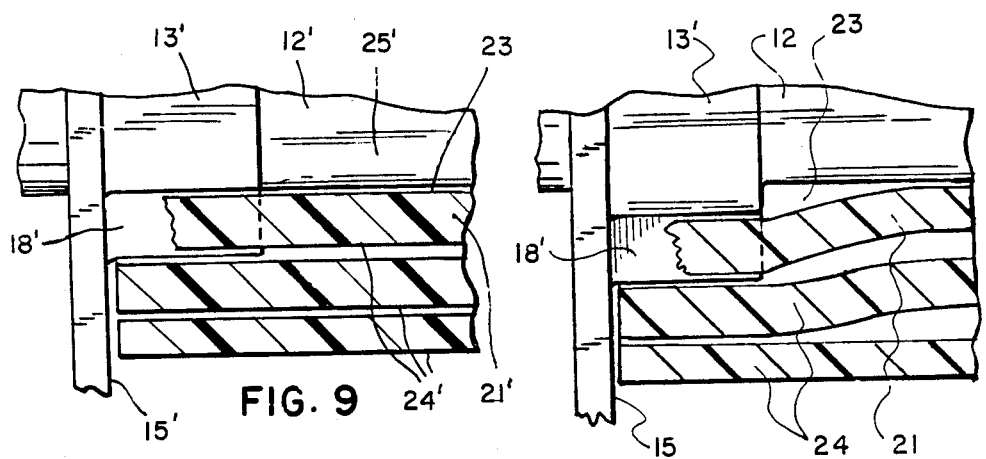
FIG. 9
FIG. 7

SPOOL FOR WEB-SHAPED FILM

FIELD OF THE INVENTION

This invention relates to a spool for web-shaped recording media, in particular photographic films, comprising a spool core having a slot and means for attaching the web end inserted into said slot with a smooth, easy and quick operation. The means for attaching the end of the photographic film to the core of the spool may be integrally formed within the core, preferably by injection molding of the spool as a unitary element including spaced flanges.

BACKGROUND OF THE INVENTION

Experience has shown that present films, particularly 35-mm photographic films, have reached such a level of sensitivity that they are adversely affected by low level protrusions which may be present on the surface of the winding core. Such protrusions may result from the winding of the narrowed portion of the web which has been attached to the spool. As the film is wound, this narrowed portion emerges from the slot, having its first convolution adjacent the spool. As the succeeding wider film is wound over the narrowed convolution, usually at high speeds and pressure, the surfaces on which these successive widths of film overlay are often uneven because of the previously wound narrowed portion of the film adapted to be secured to the spool. This condition results in a finished film having pressure marks, caused by such surface unevenness and the subsequent difference in pressure on the succeeding convolutions wound around the uneven surface at the spool core.

Other protrusions may occur as a result of the injection-molding process for producing an integral film spool as a unitary element. These protrusions can result from flashing imperfections which occur at the parting line of the mold. Such flashing defects may rise no higher than about 0.005 inch above the core surface; however, such defects are sufficient to cause pressure marks on subsequently wound film. In addition, imperfections can occur as a result of scratches on the core surface which occur during the handling of the spool prior to the film-winding operation.

Previous attempts to eliminate such pressure marks from films of the type having a narrowed trailing end attached to a slotted spool have not been entirely successful. They have relied upon, for example, a grooved central portion of the core which attempts to compensate for the thickness and length of the wound narrowed trailing end of the film. Such spools are incapable of solving the pressure marks resulting from spools manufactured by an injection-molding process, or imperfections to the spool-core surface which are received prior to the winding and packaging of the highly sensitive film.

It is the object of the present invention to provide a slotted spool which, when manufactured as a unitary part by means of an injection-molding process, provides a smooth, even supporting surface for convolutions of the wound film, thereby eliminating pressure marks on the film.

SUMMARY OF THE INVENTION

Accordign to the present invention, there is provided a photographic film spool comprising a core member with end flanges, between which a flexible film strip can be wound. The core can have an elongated slot into which the end portion of a film strip may be entered and fastened. Adjacent the flanges are raised shoulders extending about the circumference of the core and above the core surface which extend in a gradually increasing thickness until said shoulders terminate in a stepped portion corresponding to the thickness of the film. In a preferred embodiment, the spool core has shoulder means adjacent said flanges to accommodate the edge portion of a full-width film, said shoulder means having an initial height above the surface level of said spool, then rising gradually to an additional height approximately equal to the thickness of the film. When the full-width portion of the film is juxtaposed the spool flanges, said shoulders provide the film with a substantially level transition surface for each convolution of the full-width film, thereby avoiding imperfections on the spool-core surface.

The film-anchoring projection on the spool may be formed like a hook.

The spool is preferably injection-molded as a unitary piece from a synthetic plastic.

BRIEF DESCRIPTION OF THE DRAWINGS

The accompanying drawings will describe in detail one embodiment of the invention in which the reference characters refer to the same parts throughout the several figures.

FIG. 1 is a perspective view of a film spool and a piece of film strip adapted to be attached to the film spool constructed in accordance with and embodying a preferred form of my invention.

FIG. 7 is a partial section on line 7—7 of FIG. 6, but with a partial view of convolutions of film wound thereon.

FIG. 8 is a partial perspective view of the preferred embodiment of the invention with convolutions of film in place.

FIG. 9 is a partial section of another embodiment of the invention with convolutions of film in place.

DETAILED DESCRIPTION OF THE INVENTION

Figure 2:
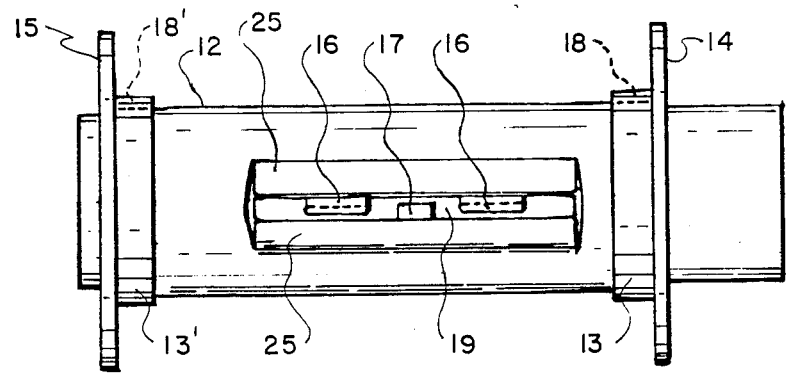
FIG. 2 is a front elevation of the film spool shown in FIG. 1.
Figure 3:
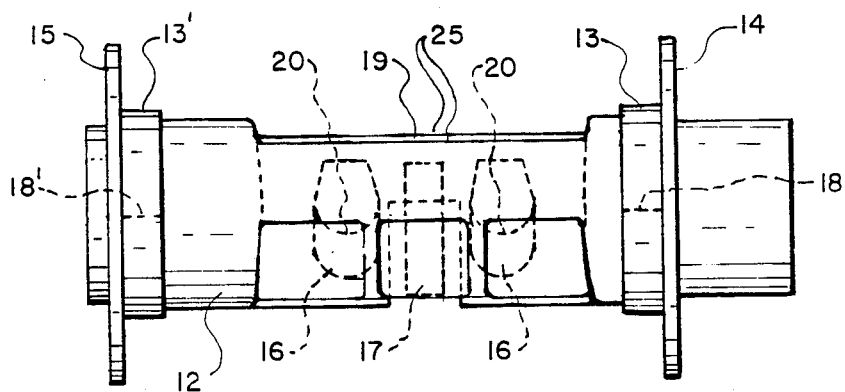
FIG. 3 is a top view of the film spool shown in FIG. 1.
Figure 4:
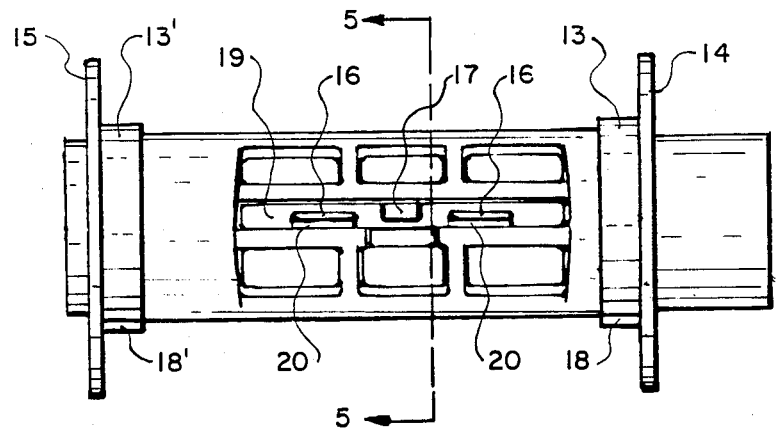
FIG. 4 is a rear view of the film spool shown in FIG. 1.

In accordance with one preferred embodiment of my invention shown in FIG. 1, the spool 10 includes spaced flanges 14,15 for defining the maximum width of film to be wound about the spool 10. The spool 10 further includes an integrally formed cylindrical core 12 for coupling spaced flanges 14,15. Preferably, the spool may be injection-molded as a unitary piece from a soft plastic material. The core 12 includes an insertion slot 19, of generally rectangular cross-section, extending axially through its central portion. The slot is used for inserting and fastening the trailer of the photographic film 21, e.g., a 35-mm film strip, which, after being fastend, is wound on the spool. For this purpose, the narrowed portion 21 of the film strip is inserted into the slot 19 from the left and, after attaching the film in said slot, the film spool 10 is rotated in a clockwise direction as viewed in FIG. 1.

Figure 5:
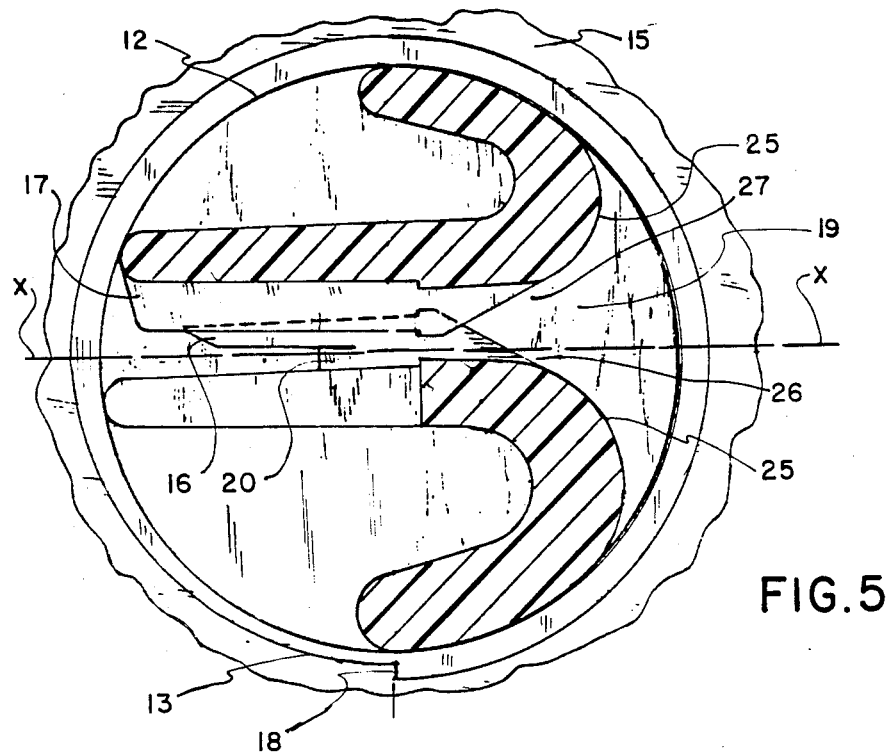
FIG. 5 is a section on line 5—5 of FIG. 4.
Figure 6:
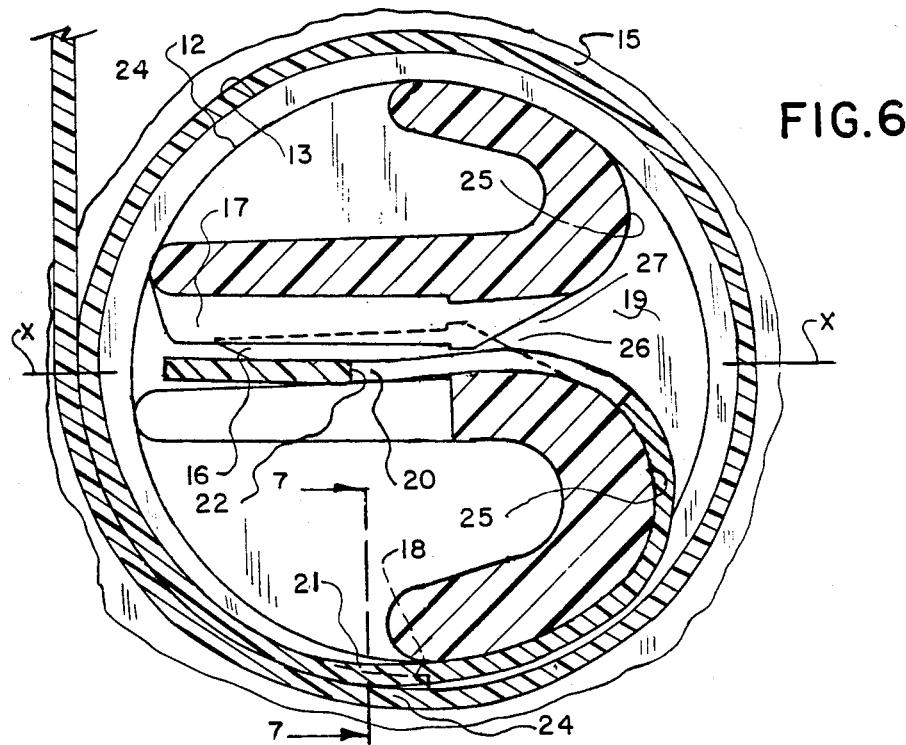
FIG. 6 is a section on line 5—5 of FIG. 4, but with convolutions of film wound thereon.

Retention hooks 16 used for fastening the film are integrally molded with the upper wall of the slot 19, respectively, to the right and left of the center of the the slot 19. Each retention hook 16 is further provided with an inclined front surface 26 (see FIGS. 5 and 6) on the insertion side of the core so that it may readily guide and direct the inserted narrowed end of the film strip up and over the tip of the retention hooks 16 until apertures 22 formed as elongated holes reach the tip of the hooks 16 and drop over said hooks into the base slots 20 of the hooks, which ensure locking of the film strip. In a manner known per se, the base slot 20 of the hook 16 is adapted to a configuration of the engaging aperture 22 of the film strip so that the film edge closely conforms to the base slot 20 configuration. As seen in FIGS. 5 and 6, the base slot 20 lies on or in proximity to the central plane x—x of the spool core 10. Transition surfaces 25 merge with the walls of slot 19 and are formed to provide a smooth, uniform curvature for the fastened film strip as it is wound about the spool core.

A hold-down projection member 17 is integrally molded from the lower wall of the slot 19 and is also provided with a ramp 27 on the film-inserting side of the slot. The hold-down projection 17 causes the center portion of the narrowed end of the film when inserted into the slot 19 to bend downwardly, while the narrowed end sides containing the apertures 22 are urged upward in the longitudinal axis of the film strip. When the apertured holes engage the hooks 16 and settle into the base slots 20, the film strip will flatten out again due to its natural state of rigidity and thus seat firmly in the base slot 20 of the retention hooks 16.

The photographic film strip used with the spool of the present invention should have at least two apertures at its extreme end. By referring to FIG. 1, it is noted that a film strip 24 at its extreme end includes the narrowed end 21 having opposed apertures 22. These apertures may be either circular or elliptical, with the distance between the apertures corresponding to the distance between the spaced retention hooks 16.

Referring now to FIGS. 1 and 2-4, there are formed, generally adjacent flanges 14,15, raised shoulders 13,13′ which extend about the circumference of the core 12. The shoulders extend in a gradually increasing thickness, up to the thickness of the film strip, from a region where the full width of an attached and wound film strip is first juxtaposed the spaced flanges 14,15. The stepped regions 18,18′ of shoulders 13,13′ are shown to terminate approximately 360° or one complete convolution from the region at which their thickness increase commences, i.e., where the winding of the narrowed tab portion is complete and the first full width portion of the film strip is wound upon the spool. The shoulders 13,13′ extend inward from the spaced flanges 14,15 a distance which will assure they are at least outside the usable image area of the wound film.

FIGS. 7 and 8 illustrate a preferred embodiment of the invention wherein shoulders 13,13′ from their starting point are raised a small distance above the surface of the core 12. This initial rise could be about 0.003 to 0.010 inch, and preferably 0.005 inch, and will cause the outside edge of the entire first full-width convolution of the film 24 to lie above the central core surface. This provides a small space between the core surface 12 and the center portion of the film 24, as illustrated by numeral 23 in FIG. 7. As mentioned previously, it is difficult to avoid the prsence of slight flashing imperfections which result from injection-molding the spool. In addition, because a soft plastic material is used to injection-mold the unitary spool, it is difficult to avoid scratches on the core surface resulting from handling the spool prior to the film-winding operation. Therefore, space 23 formed by shoulders 13,13′ spaces the first full-width convolution of film above the central core area and allows the film to clear and thereby avoid slight imperfections which could result in pressure marks on the film.

After an initial rise in the height of shoulders 13,13′, the thickness of shoulders 13,13′ gradually increases to an additional height around the circumference of the core until said shoulders terminate in a stepped region 18, which corresponds in height to the thickness of the film strip. This gradual rise preferably begins within a region on the initially raised shoulders which is proximate the place where the full width of the film is first juxtaposesd flanges 14,15 or at that point at which the narrowed portion of film 21 becomes the full width of the film strip. Therefore, the second convolution of the film, as seen in FIG. 7, has a substantially flush transition surface to overlay throughout its entire width. This avoids different levels in any portion of the wound roll, either because of protruding spool imperfections or uneven transition surfaces.

FIG. 9 is shown as another embodiment of the invention. Shoulder 13′ is illustrated as starting its gradual rise from a level flush with core surface 12 and from a region proximate where the full width of an attached and wound film strip is first juxtaposed flange 15′. The height of the shoulder gradually increases circumferentially around the core to a point where it reaches the thickness of a single convolution of film terminating at stepped region 18′ approximately 360° from the region at which the full width of the film is first juxtaposed flange 15′. Thus, when the film is wound on the spool 10, the narrowed portion 21 lies in the central area of the spool between the shoulders 13,13′. Upon winding of the film, the edge portion of the first convolution of the full width of the film 24 is supported by the gradually rising shoulder 13′. The second convolution of the film 24′ will see a smooth first convolution transition surface. In addition, a slight space 23 is still maintained throughout the major portion of the first full convolution by shoulders 13,13′ between the center or image area of the film 24 and the core surface 12. This substantially avoids the problem of pressure marks which may arise resulting from imperfections on the core surface.

It can be seen that there is provided a spool structure which accomplishes all the objects of this invention, including the advantage of avoiding pressure marks resulting from imperfections on the core surface. The inventive spool provides a film spool of great utility for use with photographic film which is sensitive to pressure marks.

While this invention has been described with particular reference to several embodiments, other embodiments will be apparent to those skilled in the art.

We claim:

1. A spool for winding of a web-shaped film strip of the kind having a narrow end portion, said spool comprising a spool core having a slot for receiving such film end portion, and a pair of end flanges, said spool core having shoulder portions, respectively, adjacent said flanges to support the edge portions of the full-width film, said shoulder portions having an initial height above said core surface and rising an additional height from a region proximate the location where the full width of an inserted and wound film strip is first juxtaposed said flanges to a height approximately equal to the thickness of said film.

2. A spool according to claim 1, wherein said shoulder portions terminate approximately after one convolution of said full-width film from a region proximate the location where the full width of an inserted and wound film strip is first juxtaposed said flanges.

3. A spool according to claim 1, wherein said shoulder portions have an initial height of about 0.003 to 0.010 inch.

4. A spool according to claim 1, wherein said shoulder portions have an initial height of 0.005 inch.

5. A spool according to claim 2, wherein said shoulder portions extend inward from said flanges to a distance outside the image area of said wound film.

6. A spool according to claim 2, wherein said shoulder portions provide a space between the center portion of the first convolution of said full-width film strip and said spool-core surface to allow the film strip to clear and thereby avoid imperfections on said spool-core surface which could result in pressure marks on the film strip.

7. A spool according to claim 2, wherein said shoulder portions povide a substantially flush level surface for the second convolution of said film strip.

8. A spool for winding a strip of film having a full-width portion and a narrow end portion, said spool comprising a core having a slot for receiving such narrow end portion, a pair of end flanges, said spool having noncylindrical raised shoulder portions adjacent each of said flanges to support opposite edge portions of the full-width film portion, said shoulder portions each having (1) a first height at a region proximate the location where the full-width portion of the film is first adjacent said flanges and (2) a second height above said core, the shoulder portions gradually increasing in height in the direction film is normally wound on the spool from the first height to the second height, the second height being greater than the first height by an amount approximately equal to the thickness of said film and ending proximate the location where the first full-width portion of the film is first adjacent said flanges to provide a substantially flush level transition surface for the second convolution of the film.

9. A spool according to claim 8 wherein said raised shoulder portions project above the core sufficiently to provide a space between the center portion of the first convolution of said full-width film strip and said core to allow the film to clear and thereby avoid imperfections in said core which could result in pressure marks on the film.

* * * * *